United States Patent
Kim

(10) Patent No.: US 10,372,425 B2
(45) Date of Patent: Aug. 6, 2019

(54) METHOD FOR SHARING APPLICATION PROGRAM AND ELECTRONIC DEVICE THEREFOR

(71) Applicant: SAMSUNG ELECTRONICS CO., LTD., Suwon-si, Gyeonggi-do (KR)

(72) Inventor: Joo-Hyun Kim, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/323,735

(22) PCT Filed: Jul. 7, 2014

(86) PCT No.: PCT/KR2014/006078
§ 371 (c)(1),
(2) Date: Jan. 4, 2017

(87) PCT Pub. No.: WO2016/006726
PCT Pub. Date: Jan. 14, 2016

(65) Prior Publication Data
US 2017/0161031 A1      Jun. 8, 2017

(51) Int. Cl.
*G06F 8/30*  (2018.01)
*G06F 8/36*  (2018.01)
(Continued)

(52) U.S. Cl.
CPC .............. *G06F 8/36* (2013.01); *G06F 8/31* (2013.01); *G06F 8/51* (2013.01); *G06F 13/38* (2013.01);
(Continued)

(58) Field of Classification Search
CPC ..... G06F 8/34; G06F 8/36; G06F 8/31; G06F 8/51; G06F 13/38; G09G 5/005; G09G 2370/04
(Continued)

(56) References Cited

U.S. PATENT DOCUMENTS 8,694,925 B1 *  4/2014  Beust ................. G06F 17/2235
                                                          715/744
8,918,712 B2 * 12/2014  Nario ..................... G06F 9/445
                                                          715/239
(Continued)

FOREIGN PATENT DOCUMENTS

CN      1712221      12/2005
CN      1763716       4/2006
(Continued)

OTHER PUBLICATIONS

International Search Report for PCT/KR2014/006078 dated Mar. 2, 2015 (4 pages).
(Continued)

*Primary Examiner* — Marina Lee
(74) *Attorney, Agent, or Firm* — Nixon & Vanderhye, P.C.

(57) ABSTRACT

An apparatus and method for sharing application program in an electronic device are provided. The electronic device includes a display for displaying information, a communication interface for sending and receiving signals, and a processor for creating a sub application program comprising at least one of user interface components of an application program installed on the electronic device, and controlling to send the sub application program to an external electronic device through the communication interface.

18 Claims, 15 Drawing Sheets

FIRST ELECTRONIC DEVICE (100)

SECOND ELECTRONIC DEVICE (110)

(51) Int. Cl.
*G06F 8/51* (2018.01)
*G09G 5/00* (2006.01)
*G06F 13/38* (2006.01)

(52) U.S. Cl.
CPC ......... *G09G 5/005* (2013.01); *G09G 2370/04* (2013.01)

(58) Field of Classification Search
USPC .................................................. 717/100–123
See application file for complete search history.

(56) References Cited

U.S. PATENT DOCUMENTS

| | | | | |
|---|---|---|---|---|
| 9,336,023 | B2* | 5/2016 | Mukkamala | G06F 8/20 |
| 9,753,702 | B2* | 9/2017 | Hershenson | G06F 8/38 |
| 10,129,324 | B2* | 11/2018 | Lu | H04L 67/025 |
| 2004/0240408 | A1* | 12/2004 | Gur | G06F 8/61 |
| | | | | 370/328 |
| 2004/0255005 | A1* | 12/2004 | Spooner | G06F 17/30569 |
| | | | | 709/218 |
| 2006/0086785 | A1 | 4/2006 | Sakata | |
| 2008/0215758 | A1* | 9/2008 | Gerdes | G06F 8/65 |
| | | | | 709/248 |
| 2009/0019058 | A1 | 1/2009 | Jung et al. | |
| 2010/0312817 | A1* | 12/2010 | Steakley | G06F 8/61 |
| | | | | 709/202 |
| 2011/0154287 | A1* | 6/2011 | Mukkamala | G06F 8/20 |
| | | | | 717/105 |
| 2012/0144347 | A1* | 6/2012 | Jo | G06F 3/04883 |
| | | | | 715/863 |
| 2013/0007301 | A1* | 1/2013 | Jung | G06F 1/1632 |
| | | | | 710/5 |
| 2013/0151996 | A1* | 6/2013 | Nario | G06F 9/445 |
| | | | | 715/760 |
| 2013/0219381 | A1* | 8/2013 | Lovitt | G06F 8/65 |
| | | | | 717/173 |
| 2013/0254262 | A1* | 9/2013 | Udall | H04L 67/42 |
| | | | | 709/203 |
| 2015/0195474 | A1* | 7/2015 | Lu | G08C 17/02 |
| | | | | 348/552 |
| 2017/0161031 | A1* | 6/2017 | Kim | G06F 8/36 |

FOREIGN PATENT DOCUMENTS

| | | |
|---|---|---|
| CN | 101604247 | 12/2009 |
| CN | 101937346 | 1/2011 |
| CN | 102460388 | 5/2012 |
| KR | 10-2009-0006469 | 1/2009 |
| KR | 10-2011-0082881 | 7/2011 |
| KR | 20110082881 | 7/2011 |
| KR | 10-2012-0017466 | 2/2012 |
| KR | 10-2012-0063328 | 6/2012 |
| KR | 10-2012-0072071 | 7/2012 |
| KR | 10-2013-0050136 | 5/2013 |

OTHER PUBLICATIONS

Written Opinion of the ISA for PCT/KR2014/006078 dated Mar. 2, 2015 (5 pages).
Extended Search Report dated Mar. 13, 2018 in counterpart European Patent Application No. EP14897218.5.
Notification of First Office Action dated Apr. 15, 2019 in counterpart Chinese Patent Application No. CN201480079943.6.

* cited by examiner

METHOD FOR SHARING APPLICATION PROGRAM AND ELECTRONIC DEVICE THEREFOR

CROSS-REFERENCE TO RELATED APPLICATION

This application is the U.S. national phase of International Application No. PCT/KR2014/006078, filed on Jul. 7, 2014, which designated the United States. The contents of this PCT application are incorporated herein in their entirety.

TECHNICAL FIELD

Various embodiments of the present invention relate to an apparatus and a method for sharing an application program between electronic devices.

BACKGROUND ART

With advances in information communication technology and semiconductor technology, various electronic devices are developing to multimedia devices for providing various multimedia services. For example, a portable electronic device can provide various multimedia services such as broadcasting service, wireless Internet service, camera service, and music play service.

The electronic device can provide various multimedia services by sharing with a peripheral electronic device such as a wearable device.

DISCLOSURE OF INVENTION

Technical Problem

When an electronic device is to provide a multimedia service by sharing with a peripheral electronic device, an application program for the multimedia service can be driven in the electronic device. For example, the electronic device can send display information for the multimedia service to the peripheral electronic device by driving the application program for the multimedia service, and receive and process input/output information generated by the peripheral device.

Hence, as the electronic device continuously runs the application program for providing the multimedia service to share the multimedia service with the peripheral electronic device, the application program driving can waste resources.

An embodiment of the present invention can provide an apparatus and a method for sharing an application program with a peripheral electronic device in an electronic device.

An embodiment of the present invention can provide an apparatus and a method for sending a sub application program to a peripheral electronic device by generating the sub application including user interface configuration information of an application program in an electronic device.

An embodiment of the present invention can provide an apparatus and a method for creating a sub application program including user interface configuration information of an application program using a common programming language in an electronic device.

Solution to Problem

According to an embodiment of the present invention, an electronic device can include a display for displaying information, a communication interface for sending and receiving signals, and a processor for creating a sub application program comprising at least one of user interface components of an application program installed on the electronic device, and controlling to send the sub application program to an external electronic device through the communication interface.

According to an embodiment of the present invention, a method for operating an electronic device can include creating a sub application program comprising at least one of user interface components of an application program installed on the electronic device, and sending the sub application program to an external electronic device.

Advantageous Effects of Invention

As set forth above, as the electronic device can generate the sub application program including the user interface configuration information of the application program using the common programming language and sends to the peripheral electronic device, electronic devices of different platforms can share the multimedia service and the peripheral electronic device can provide the corresponding multimedia service without driving at the electronic device.

BEST MODE FOR CARRYING OUT THE INVENTION

Figure 1:
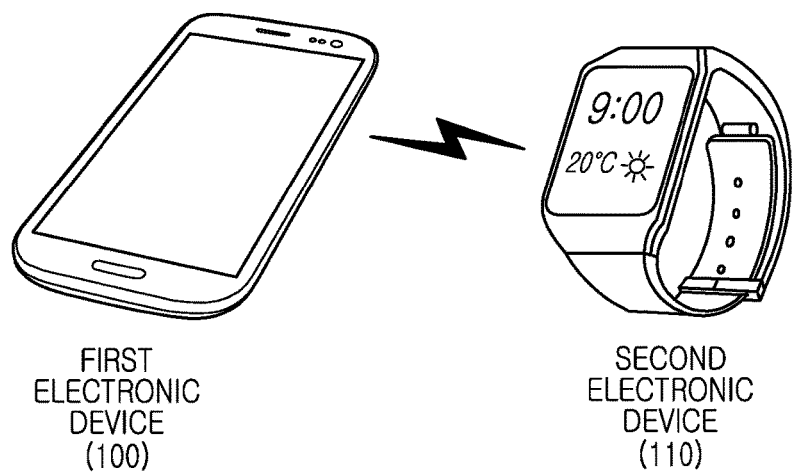
FIG. 1 depicts a configuration for sharing an application program according to an embodiment of the present invention.

Now, various embodiments of the present invention will be described with reference to the accompanying drawings. Various embodiments of the present invention can make various modifications and have various embodiments, and thus specific embodiments are described in the drawings and their detailed explanations are disclosed. It should be understood, however, that it is not intended to limit various embodiments of the present invention to the particular forms disclosed but the intention is to cover all modifications, equivalents, and/or alternatives falling within the spirit and scope of the various embodiments of the present invention. In relation to the descriptions on the drawings, like reference numerals are used for similar components.

In various embodiments of the present invention, an expression such as "include" or "can include" refers to presence such as a corresponding function, operation, or component of the disclosure, and does not limit additional one or more functions, operations, or components. In addition, in various embodiments of the present invention, a term such as "include" or "have" is intended to designate presence of a characteristic, a number, a step, an operation, a component, a part or their combination disclosed in the specification, and it should be appreciated that it does not exclude in advance the presence or addition of one or more other characteristics, numbers, steps, operations, components, parts, or combinations thereof.

In various embodiments of the present invention, an expression such as "or" or "at least one of A or/and B" includes any and every combination of words listed together. For example, "A or B" or "at least one of A or/and B" each may include A, B, or both of A and B.

Expressions such as "1st", "2nd", "first" or "second" used in various embodiments of the present invention can modify various components of various embodiments, but does not limit the corresponding components. For example, the expressions do not limit sequence and/or importance of the corresponding components. The expressions can be used to distinguish one component from another component. For example, a first user device and a second user device both are user devices and represent different user devices. For example, a first component can be named as a second component, and similarly, a second component can be named as a first component without departing from the scope of various embodiments of the present invention.

When a certain component is mentioned as being "connected to" or "coupled to", the certain component may be directly connected to or coupled to the another component but it is to be understood that a new different component may be present between the certain component and the another component. On the other hand, when a certain component is mentioned as being "directly connected to" or "directly coupled to" another component, it is be understood that other new component is not present between the certain component and the another component.

Terms used in the various embodiments of the present invention are used merely to describe particular embodiments, and are not intended to limit the various embodiments of the present invention. A singular expression includes a plural expression unless there is a contextually distinctive difference.

Unless otherwise defined, all terms used herein including technical and scientific terms have the same meaning as commonly understood by those ordinarily skilled in the art to which various embodiments of the present invention belong. It will be understood that terms such as those defined in commonly used dictionaries, should be interpreted as having a meaning that is consistent with their meaning in the context of the relevant art, and will not be interpreted in an idealized or overly formal sense unless expressly so defined herein.

An electronic device according to various exemplary embodiments of the present invention can be a device including a communication function. For example, the electronic device can include at least one of a smart-phone, a tablet Personal Computer (PC), a mobile phone, a video phone, an e-book reader, a desktop PC, a laptop PC, a net-book computer, a Personal Digital Assistant (PDA), a Portable Multimedia Player (PMP), an MP3 player, a mobile medical appliance, a camera, or a wearable device (e.g., a Head-Mounted-Device (HMD) such as electronic glasses, an electronic textiles, an electronic bracelet, an electronic necklace, an appcessory, electronictattoo, or a smart watch).

According to some embodiments, the electronic device can be a smart home appliance having the communication function. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, or a digital frame.

According to some embodiments, the electronic device can include at least one of various medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), avionics, a security device, a vehicle head unit, an industrial or domestic robot, an Automatic Teller Machine (ATM) of a financial institution, or a Point Of Sales (POS) of a retail shop.

According to some embodiments, the electronic device can include at least one of part of furniture or building/structure including the communication function, an electronic board, an electronic signature receiving device, a projector, or various gauges (e.g., gauges for water, electricity, gas, and radio wave). The electronic device according to various embodiments of the present invention can be one or a combination of those various devices. Also, the electronic device according to various embodiments of the present invention can be a flexible device. Also, those skilled in the art shall understand that the electronic device according to various embodiments of the present invention is not limited those devices.

Hereinafter, an electronic device according to various embodiments is described by referring to the attached drawings. The term "user" used in various embodiments can indicate a person who uses the electronic device or a device (e.g., an artificial intelligence electronic device) which uses the electronic device.

Hereinafter, various embodiments of the present invention provide a technique for sharing an application program in an electronic device.

FIG. 1 depicts a configuration for sharing an application program according to an embodiment of the present invention.

Referring to FIG. 1, when a first electronic device 100 and a second electronic device 110 share an application program, the first electronic device 100 can create a sub application program based on at least one User Interface (UI) component of the application program for sharing with the second electronic device 110. In so doing, the first electronic device 100 can create the sub application program using a common programming language (e.g., HyperText Markup Language (HTML)).

The second electronic device 110 can install the sub application program received from the first electronic device 100 and thus execute at least some functions of the application program corresponding to the sub application program. For example, the second electronic device 110 can drive the sub application program in association with or separately from the application program of the first electronic device 100.

Figure 2:
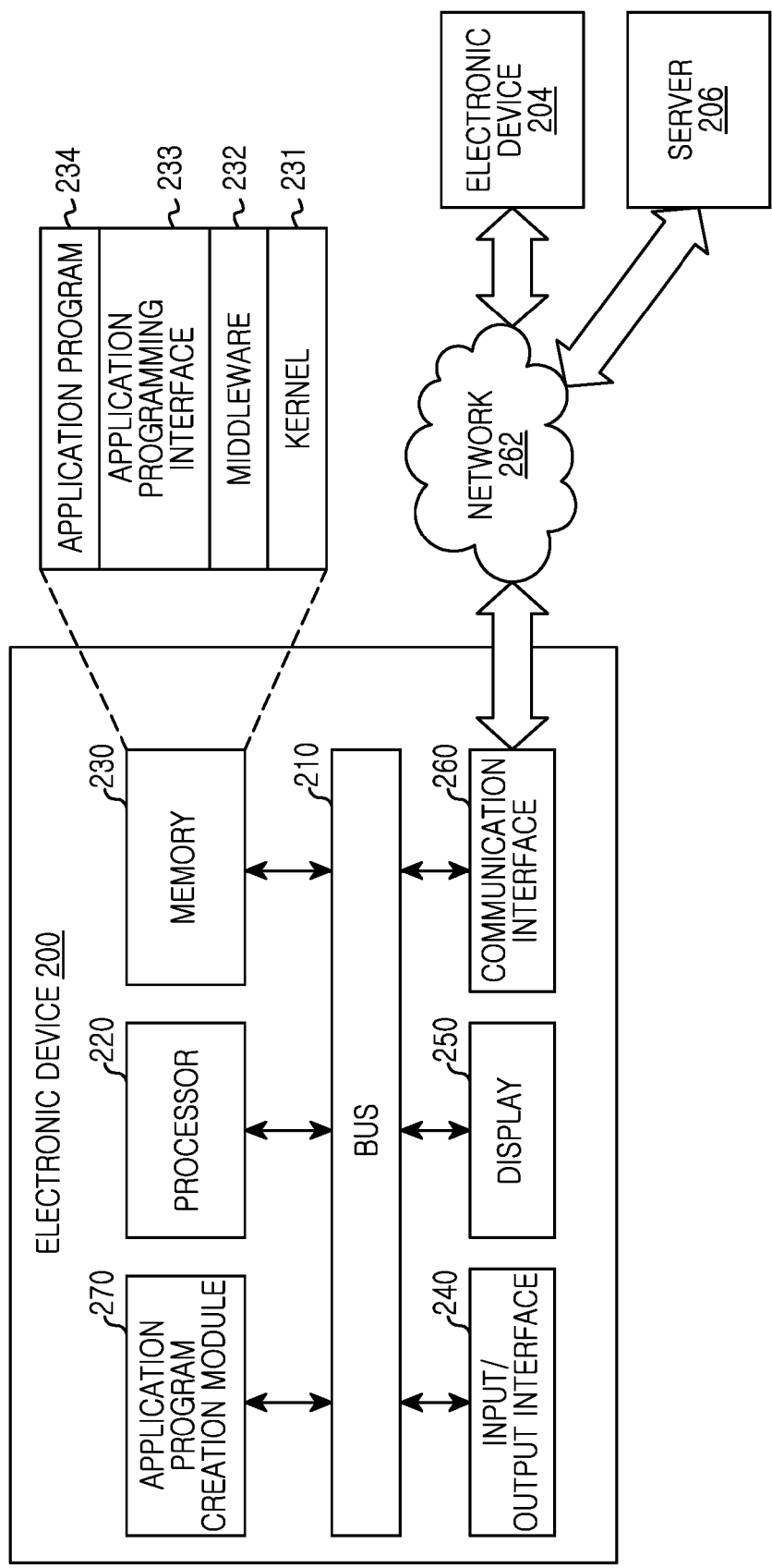
FIG. 2 depicts a block diagram of a first electronic device according to an embodiment of the present invention.

FIG. 2 depicts a block diagram of a first electronic device according to an embodiment of the present invention. Hereafter, a first electronic device 200 can indicate the first electronic device 100 of FIG. 1.

Referring to FIG. 2, the first electronic device 200 can include a bus 210, a processor 220, a memory 230, an input/output interface 240, a display 250, a communication interface 260, and an application program creation module 270.

The bus 210 can be a circuit for interlinking the above-stated components (e.g., the processor 220, the memory 230, the input/output interface 240, the display 250, the communication interface 260, or the application program creation module 270) and transferring communications (e.g., control messages) between the above-stated components.

The processor 220 can receive and interpret an instruction from the other components (e.g., the memory 230, the input/output interface 240, the display 250, the communication interface 260, or the application program creation module 270) via the bus 210, and process an operation or data according to the interpreted instruction. For example, when receiving event information from an external electronic device 204 through the communication interface 260, the processor 220 can process an event generated in the external electronic device 204 using the event information. The processor 220 can transmit event processing information to the external electronic device 204 through the communication interface 260.

The memory 230 can store the instruction or the data received from the processor 220 or the other components (e.g., the input/output interface 240, the display 250, the communication interface 260, or the application program creation module 270) or generated by the processor 220 or the other components. For example, the memory 230 can store display information of at least one external electronic device which is input by at least one of a device developer or an application program developer in a manufacture phase of the electronic device 200. For example, the memory 230 can include programming modules such as a kernel 231, middleware 232, an Application Programming Interface (API) 233, or an application program 234. Each programming module 231, 232, 233, or 234 can be implemented using software, firmware, and hardware, or a combination of at least two of them.

The kernel 231 can control or manage system resources (e.g., the bus 210, the processor 220, or the memory 230) used to execute the operation or the function of the other programming modules (e.g., the middleware 232, the API 233, or the application program 234). The kernel 231 can provide an interface allowing the middleware 232, the API 233, or the application program 234 to access and to control or manage the individual component of the electronic device 200.

The middleware 232 can serve as an intermediary so that the API 233 or the application program 234 can communicate data with the kernel 231. The middleware 232 can control a work request received from the application program 234. For example, the middleware 232 can control the work request (e.g., scheduling or load balancing) the work request by giving priority for using the system resources (e.g., the bus 210, the processor 220, or the memory 230) of the electronic device 200 to at least one application program of the application program 234.

The API 233 can include an interface or a function (e.g., instruction) for the application 234 to control a function provided from the kernel 231 or the middleware 232. For example, the API 233 can include at least one interface such as file control, window control, image processing, or text control.

According to various embodiments, the application program 234 can include a Short Message Service (SMS)/Multimedia Messaging Service (MSM) application program, an e-mail application program, a calendar application program, an alarm application program, a health care application program (e.g., an application program for measuring an exercise or a blood sugar), or an environment information application program (e.g., an application program for providing air pressure, humidity, or temperature information). The application program 234 can be an application program relating to information exchange between the electronic device 200 and the external electronic device (e.g., an electronic device 204). For example, the application program relating to the information exchange can include a notification relay application program for relaying particular information to the external electronic device or a device management application program for managing the external electronic device.

For example, the notification relay application program can relay the notification information of the other application program (e.g., the SMS/MMS application program, the e-mail application program, the health care application program, or the environment information application program) of the electronic device 200 to the external electronic device (e.g., the electronic device 204). For example, the notification relay application program can receive and provide the notification information from the external electronic device (e.g., the electronic device 204) to the user. For example, the device management application program can manage (e.g., install, delete, or update) at least part of the function (e.g., power-on/power-off of the external electronic device (or some components) or display brightness (or resolution) control) of the external electronic device (e.g., the electronic device 204) communicating with the electronic device 200, the application program running on the external electronic device, or a service (e.g., a call service or a messaging service) provided by the external electronic device.

According to various embodiments, the application program 234 can include an application program designated based on an attribute (e.g., a type of the electronic device) of the external electronic device (e.g., the electronic device 204). For example, when the external electronic device is an MP3 player, the application program 234 can include an application program regarding music play. Similarly, when the external electronic device is a mobile medical device, the application program 234 can include an application program regarding health care. According to an embodiment, the application program 234 can include at least one of the application program designated in the electronic device 200 or an application program received from the external electronic device (e.g., a server 206 or the electronic device 204).

The input/output interface 240 can forward the instruction or the data input from the user through an input/output device (e.g., a sensor, a keyboard, or a touch screen) to the other components (e.g., the processor 220, the memory 230, the display 250, the communication interface 260, or the application program creation module 270). For example, the input/output interface 240 can forward the data of the user's touch input through the touch screen, to the processor 220. Also, the input/output interface 240 can output the instruction or the data received from the processor 220, the memory 230, the communication interface 260, or the application program creation module 270 via the bus 10, through an input/output device (e.g., a speaker or a display). For example, the input/output interface 240 can output voice data processed by the processor 220 to the user through a speaker.

The display 250 can display various information (e.g., multimedia data or text data) to the user. For example, the display 250 can include a display panel, such as Liquid Crystal Display (LCD), Plasma Display Panel (PDP), Organic Light Emitting Diodes (OLED), including a plurality of pixels in an array, and a Display Driver Integrated Circuit (DDI) for driving the display panel.

The display 250 can be implemented in the same size as a whole size of a one-way mirror or a half mirror or in at least partial size of the one-way mirror or the half mirror, and one or more mirrors may be implemented. Also, the display 250 may provide a partial display function which activates only a particular pixel area.

The communication interface 260 can connect the communication between the electronic device 200 and the external device (e.g., the electronic device 204 or the server 206). For example, the communication interface 260 can communicate with the external device by accessing the network 262 using wireless communication or wired communication. For example, the wireless communication can include at least one of Wireless Fidelity (Wi-Fi), Bluetooth (BT), Near Field Communication (NFC), Global Positioning System (GPS), or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile Communications (GSM)). For example, the wired communication can include at least one of Universal Serial Bus (USB), High Definition Multimedia Interface (HDMI), Recommended Standard (RS) 232, or Plain Old Telephone Service (POTS).

According to an embodiment, the network 262 can be a telecommunications network. For example, the telecommunications network can include at least one of a computer network, Internet, Internet of things, or a telephone network.

According to an embodiment, a communication protocol (e.g., transport layer protocol, data link layer protocol, or physical layer protocol) between the electronic device 200 and the external device can be supported by at least one of the application program 234, the API 233, the middleware 232, the kernel 231, and the communication interface 260.

According to an embodiment, the server 206 can support the driving of the electronic device 200 by performing at least one of the operations (or functions) executed in the electronic device 200.

The application program creation module 270 can create the sub application program to transmit to the external electronic device (e.g., the electronic device 204) by using at least part of the information obtained from the other components (e.g., the processor 220, the memory 230, the input/output interface 240, or the communication interface 260). The application program creation module 270 can generate the sub application program using the common programming language (e.g., HTML) so that the external electronic device on a different platform can drive the sub application program. For example, the application program creation module 270 can generate the sub application program to transmit to the external electronic device based on the UI component of the application program for sharing with the external electronic device (e.g., the electronic device 204) and display information of the external electronic device. Herein, the display information of the external electronic device (e.g., the electronic device 204) can include at least one of a display area size or a resolution of the external electronic device. Further information about the application program creation module 270 is provided through FIG. 3.

In FIG. 2, the electronic device 200 can include the application program creation module 270 separated from the processor 220.

According to an embodiment, the electronic device 200 can be configured to perform at least some or all of the functions of the application program creation module 270 in the processor 220.

Figure 3:
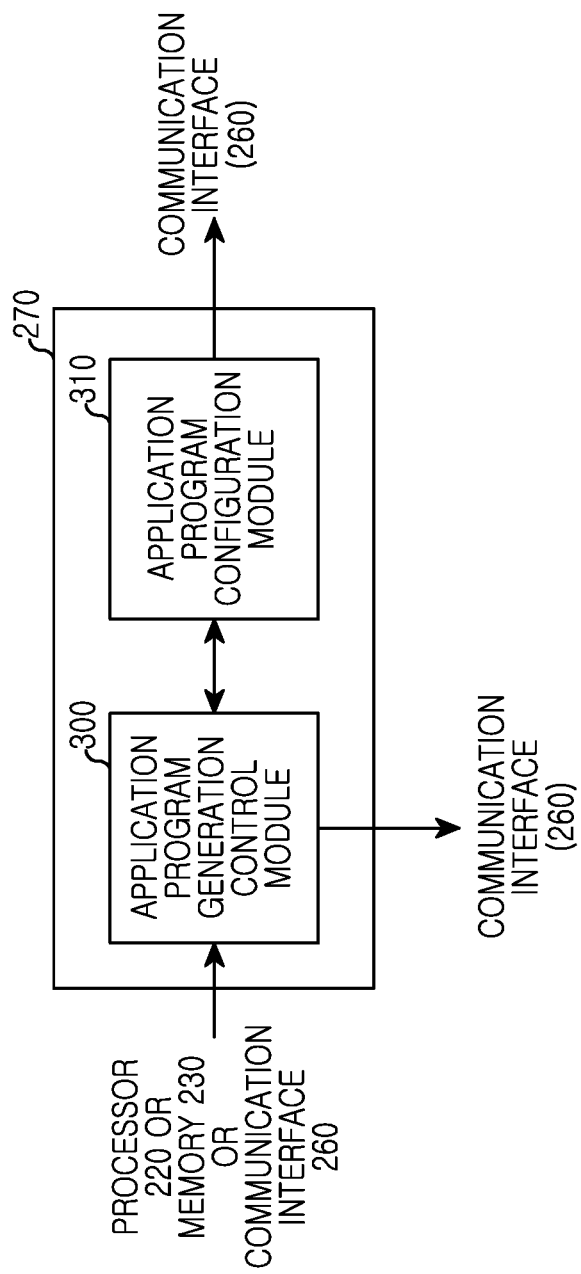
FIG. 3 depicts a block diagram of an application program creation module according to an embodiment of the present invention.

FIG. 3 depicts a block diagram of an application program creation module according to an embodiment of the present invention.

Referring to FIG. 3, the application program creation module 270 can include an application program generation control module 300 and an application program configuration module 310.

The application program generation control module 300 can obtain the display information of the external electronic device (e.g., the electronic device 204) required for the application program configuration module 310 to create the sub application program. For example, the application program generation control module 300 can identify the external electronic device (e.g., the electronic device 204) communicatively connected, and obtain the display information of the corresponding external electronic device from the memory 230. When there is no display information of the corresponding external electronic device in the memory 230, the application program generation control module 300 can request and receive the display information of the corresponding external electronic device from a server. For example, the application program generation control module 300 can identify the external electronic device (e.g., the electronic device 204) communicatively connected, and request and receive the display information of the corresponding external electronic device from the server. For example, the application program generation control module 300 can receive the display information of the corresponding external electronic device from the external electronic device (e.g., the electronic device 204) communicatively connected.

The application program configuration module 310 can create the sub application program to transmit to the external electronic device (e.g., the electronic device 204). The application program configuration module 310 can generate the sub application program based on at least one of the UI component of the application program for sharing with the external electronic device and the display information of the external electronic device received from the application program generation control module 300.

According to an embodiment, the application program configuration module 310 can generate a basic structure (e.g., HTML Document Object Model (DOM)) of the sub application program using the common programming language. The application program configuration module 310 can modify the basic structure of the sub application program based on the display information of the external electronic device. For example, the application program configuration module 310 can adjust at least one of a size (e.g., UI size) of information to display on the external electronic device, margins, indents, a font (e.g., font type, font size), image layout, or a size ratio between objects in the basic structure of the sub application program based on the display information of the external electronic device. The application program configuration module 310 can set the UI component of the application program to be applied to the sub application program based on the display information of the external electronic device. For example, the application program configuration module 310 can select UI components to be applied to the sub application program from UI components of the application program based on the display information of the external electronic device, and determine layout information of the selected UI components.

According to an embodiment, the application program configuration module 310 can generate the structure of the sub application program corresponding to the display information of the external electronic device through the common programming language. For example, the application program configuration module 310 can generate the structure of the sub application program including the size (e.g., UI size) of the information to display on the external electronic device, the margins, the indents, the font (e.g. font type, font size), the image layout, or the size ratio between objects, corresponding to the display information of the external electronic device. The application program configuration module 310 can set the UI component of the application program to be applied to the sub application program based on the display information of the external electronic device. For example, the application program configuration module 310 can select UI components to be applied to the sub application program from UI components of the application program based on the display information of the external electronic device, and determine layout information of the selected UI components.

Additionally, the application program configuration module 310 can set the external electronic device to process an operation of an interaction with the user through the sub application program in the external electronic device, or to process in association with the first electronic device 200. According to an embodiment, the application program configuration module 310 can set association information with the first electronic device 200 in the sub application program so that the external electronic device can process the operation of the interaction with the user through the sub application program in association with the first electronic device 200. For example, the application program configuration module 310 can set the association information in the sub application program so that the external electronic device installing the sub application program can request the operation of the interaction with the user such as button input from the first electronic device 200. The application program configuration module 310 can set the association information using an asynchronous processing object such as Asynchronous Java script and XML (AJAX).

Figure 4:
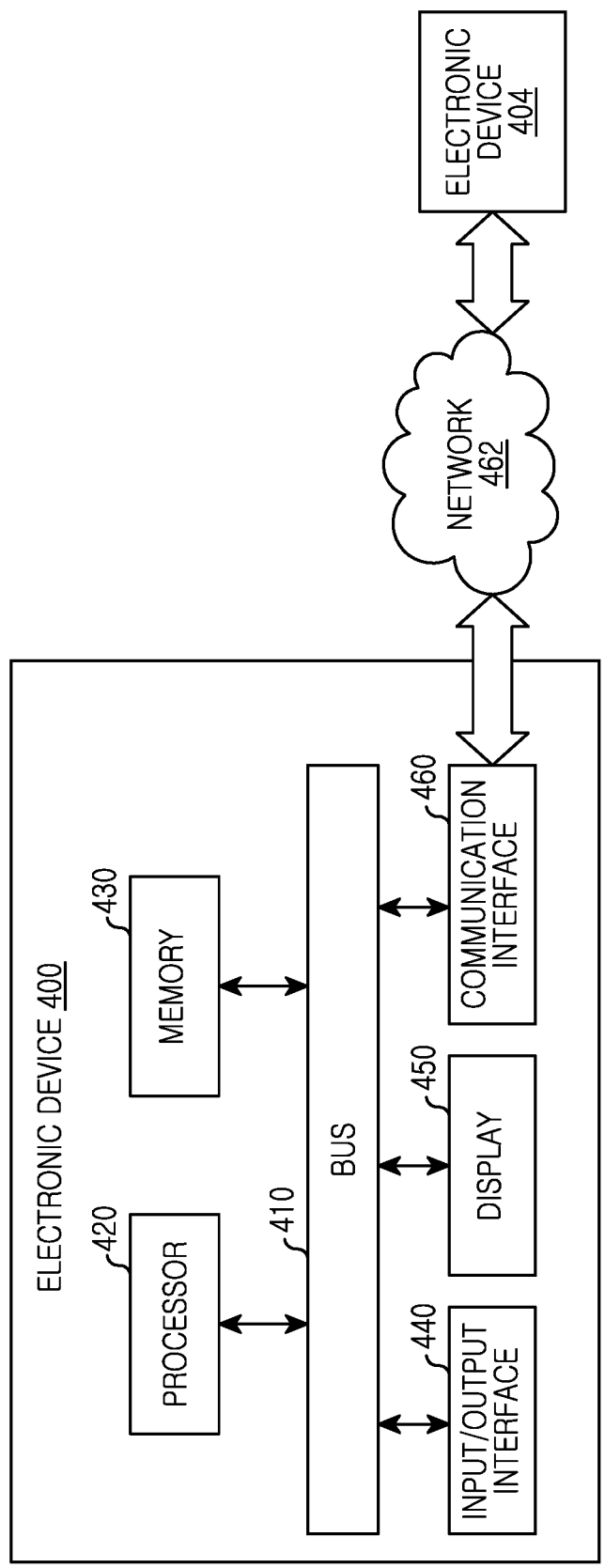
FIG. 4 depicts a block diagram of a second electronic device according to an embodiment of the present invention.

FIG. 4 depicts a block diagram of a second electronic device according to an embodiment of the present invention. Hereafter, the second electronic device 400 can indicate the second electronic device 110 of FIG. 1.

Referring to FIG. 4, the second electronic device 400 can include a bus 410, a processor 420, a memory 430, an input/output interface 440, a display 450, and a communication interface 460.

The bus 410 can be a circuit for interlinking the above-stated components (e.g., the processor 420, the memory 430, the input/output interface 440, the display 450, or the communication interface 460) and transferring communications (e.g., control messages) between the components.

The processor 420 can receive and interpret an instruction from the other components (e.g., the memory 430, the input/output interface 440, the display 450, or the communication interface 460) via the bus 410, and process an operation or data according to the interpreted instruction. For example, when receiving sub application program information from an external electronic device 404 through the communication interface 460, the processor 420 can install and drive the sub application program. When the sub application program is created with the common programming language (e.g., HTML), the processor 420 can install and drive the sub application program provided from other external electronic device of a different platform.

Additionally, in the sub application program driving, when detecting an input for the user interaction such as button input through the input/output interface 440, the processor 420 can control to process an event corresponding to the detected input through the input/output interface 440. According to an embodiment, the processor 420 can control to process event information corresponding to the detected input through the input/output interface 440, in association with the external electronic device 404. For example, the processor 420 can send the event information to the external electronic device 404 through the communication interface 460.

According to an embodiment, the processor 420 can check whether the second electronic device 400 can process the event corresponding to the detected input through the input/output interface 440. When the second electronic device 400 can process the corresponding event, the processor 420 can process the corresponding event. When the second electronic device 400 cannot process the corresponding event, the processor 420 can control to process in association with the external electronic device 404 based on the association information of the sub application program. When the external electronic device 404 is not connected, the processor 420 can generate a warning event notifying that the event processing is limited. Herein, the warning event can include at least one of warning message displaying, warning sound generation, and vibration generation.

The memory 430 can store the instruction or the data received from the processor 420 or the other components (e.g., the input/output interface 440, the display 450, or the communication interface 460) or generated by the processor 420 or the other components.

The input/output interface 440 can forward the instruction or the data input from the user through an input/output device (e.g., a sensor, a keyboard, or a touch screen) to the other components (e.g., the processor 420, the memory 430, the display 450, or the communication interface 460). For example, the input/output interface 440 can forward the data of the user's touch input through the touch screen, to the processor 420. Also, the input/output interface 440 can output the instruction or the data received from the processor 420, the memory 430, or the communication interface 460 via the bus 410, through an input/output device (e.g., a speaker or a display). For example, the input/output interface 440 can output voice data processed by the processor 420 to the user through a speaker.

The display 450 can display various information (e.g., multimedia data or text data) to the user. For example, the display 450 can include a display panel, such as LCD, PDP, OLED, including a plurality of pixels in an array, and a DDI for driving the display panel.

The display 450 can be implemented in the same size as a whole size of a one-way mirror or a half mirror or in at least partial size of the one-way mirror or the half mirror, and one or more mirrors may be implemented. Also, the display 450 may provide a partial display function which activates only a particular pixel area.

The communication interface 460 can connect the communication between the electronic device 400 and the external device (e.g., the electronic device 404). For example, the communication interface 460 can communicate with the external device by accessing the network 462 using wireless communication or wired communication. For example, the wireless communication can include at least one of Wi-Fi, BT, NFC, GPS, or cellular communication (e.g., LTE, LTE-A, CDMA, WCDMA, UMTS, WiBro, or GSM). For example, the wired communication can include at least one of USB, HDMI, RS 232, or POTS.

According to an embodiment, the network 462 can be a telecommunications network. For example, the telecommunications network can include at least one of a computer network, Internet, Internet of things, and a telephone network.

According to an embodiment, a communication protocol (e.g., transport layer protocol, data link layer protocol, or physical layer protocol) between the electronic device 400 and the external device can be supported by at least one of an application program, an API, middleware, a kernel, or the communication interface 460 which are programming modules included in the memory 430.

According to various embodiments of the present invention, an electronic device (e.g., the first electronic device 100 of FIG. 1 or the electronic device 200 of FIG. 2) can include a display for displaying information, a communication interface for sending and receiving signals, and a processor for creating a sub application program comprising at least one of user interface components of an application program installed on the electronic device, and controlling to send the sub application program to an external electronic device through the communication interface.

In an embodiment of the present invention, the processor can creates the sub application program by converting at least one of the user interface components of the application program to a component of a common programming language.

In an embodiment of the present invention, the processor can create the sub application program based on HTML.

In an embodiment of the present invention, the processor can obtains display information of the external electronic device, generate a structure of the sub application program based on the display information of the external electronic device, determine at least one component to add to the sub application program among user interface components of an application program based on the display information of the external electronic device, and create the sub application program corresponding to the application program based on the generated structure of the sub application program and the at least one determined component.

In an embodiment of the present invention, a memory is further included, and the processor can obtain the display information corresponding to identification information of the external device among multiple display information stored in the memory.

In an embodiment of the present invention, the processor can obtain the display information of the external electronic device received from a server through the communication interface.

In an embodiment of the present invention, the processor can convert at least one component to add to the sub application program, to a component of the common programming language, and create the sub application program corresponding to the application program by applying the component of the common programming language to the structure of the sub application program.

In an embodiment of the present invention, the processor can obtain the display information of the external electronic device comprising at least one of a display area size or a resolution of the external electronic device.

In an embodiment of the present invention, the processor can create the sub application program to process an event generated in the external electronic device in association with the electronic device through the sub application program using an asynchronous processing object.

Figure 5:
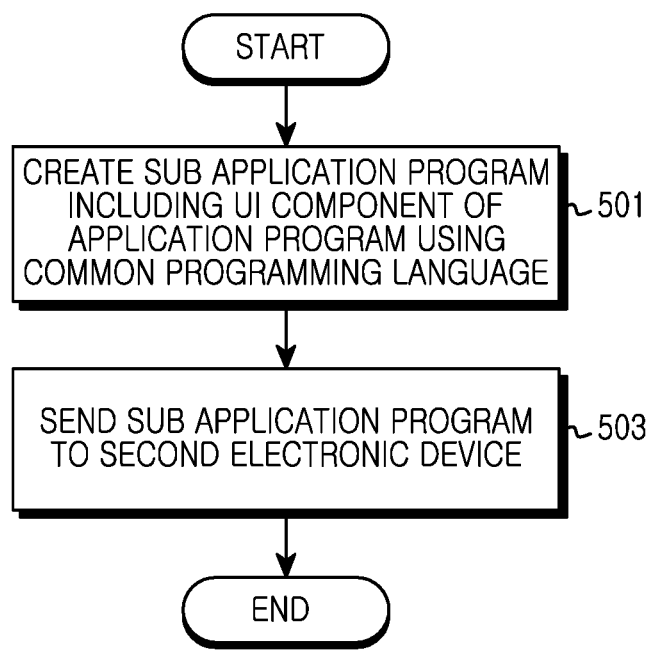
FIG. 5 depicts a flowchart for generating a sub application program in a first electronic device according to an embodiment of the present invention.

FIG. 5 depicts a flowchart for creating a sub application program in a first electronic device according to an embodiment of the present invention. Hereafter, the creation of the sub application program using screens of FIGS. 6A and 6B can be explained.

Figures 6A, 6B:
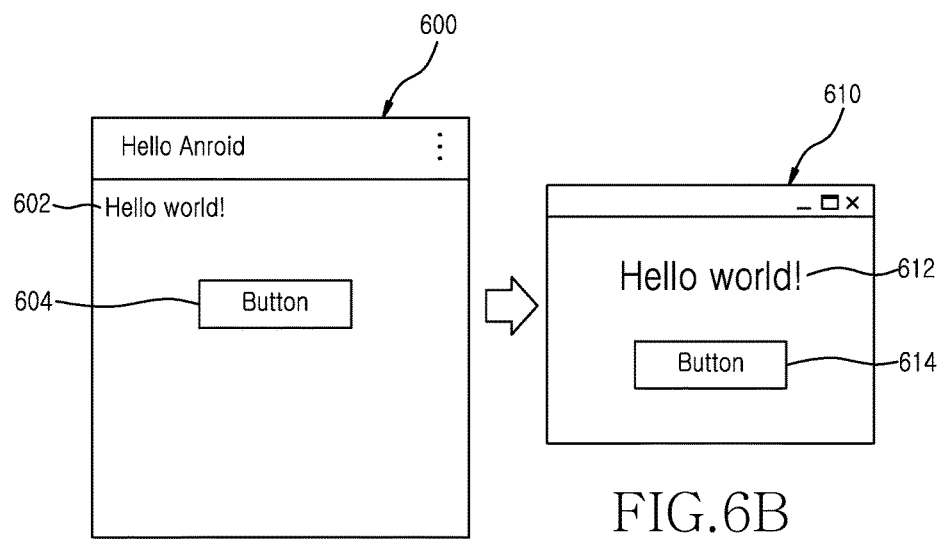
FIGS. 6A through 6B depict a screen configuration of a sub application program according to an embodiment of the present invention.

Referring to FIG. 5, in operation 501, the electronic device (e.g., the first electronic device 100 of FIG. 1 or the electronic device 200 of FIG. 2) can create a sub application program including at least one UI component of an application program installed on the electronic device using a common programming language (e.g. HTML). For example, the electronic device can generate an HTML-based web application program including at least one UI component of the application program installed on the electronic device. For example, the electronic device can convert at least one of UI components 600 of the application program such as text 602 and button 604 as shown in FIG. 6A, to an HTML component. The electronic device can create a sub application program including HTML components 612 and 614 based on the display information of the second electronic device (e.g., the second electronic device 110 of FIG. 1 or the electronic device 400 of FIG. 4).

In operation 503, the electronic device can send the sub application program to the second electronic device.

Figure 7:
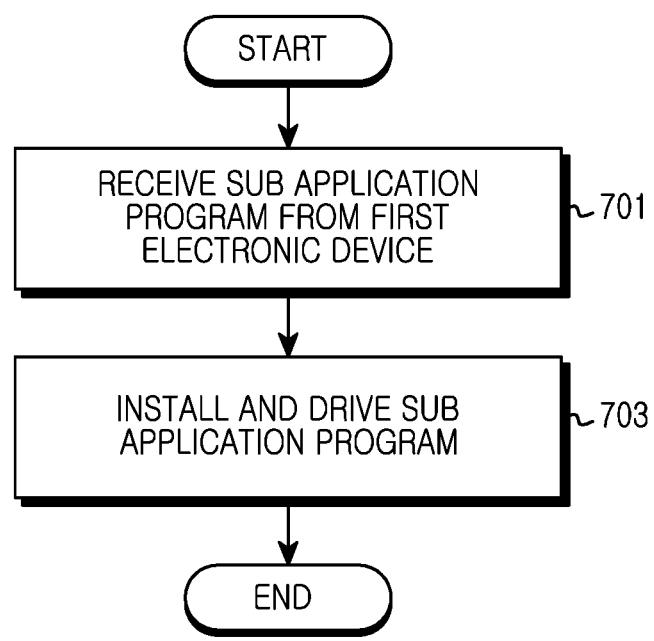
FIG. 7 depicts a flowchart for installing a sub application program in a second electronic device according to an embodiment of the present invention.

FIG. 7 depicts a flowchart for installing a sub application program in a second electronic device according to an embodiment of the present invention.

Referring to FIG. 7, in operation 701, the electronic device (e.g., the second electronic device 110 of FIG. 1 or the electronic device 400 of FIG. 4) can receive information of a sub application program from the first electronic device (e.g., the first electronic device 100 of FIG. 1 or the electronic device 200 of FIG. 2). For example, the electronic device can receive installation information of the sub application program from the first electronic device.

In operation 703, the electronic device can install and drive the sub application program received from the first electronic device.

Figure 8:
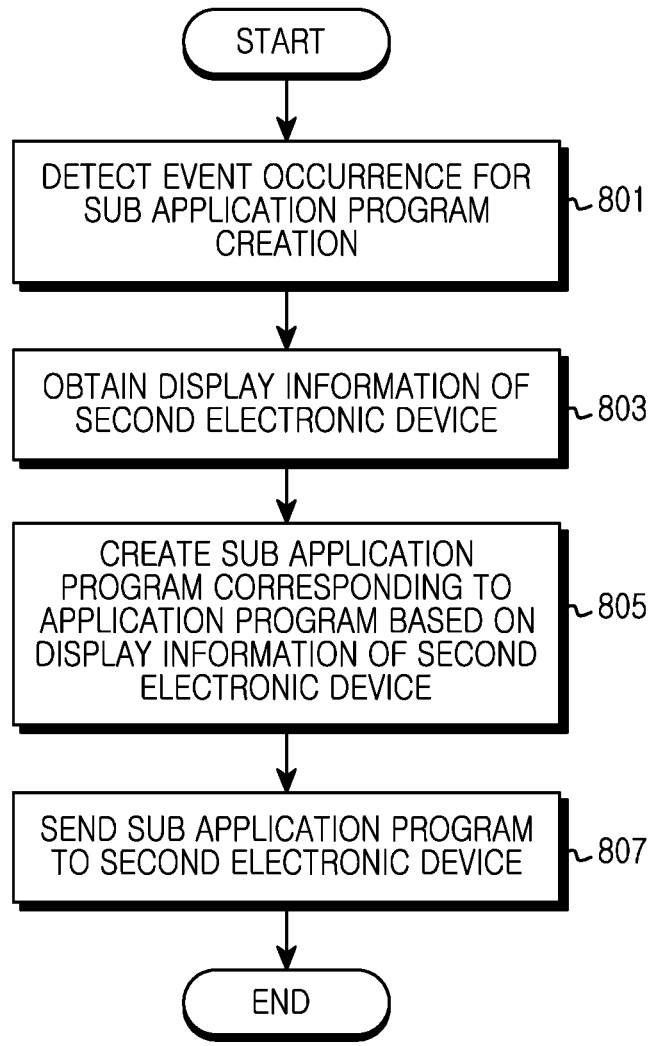
FIG. 8 depicts a flowchart for generating a sub application program based on display information of a second electronic device according to an embodiment of the present invention.

FIG. 8 depicts a flowchart for creating a sub application program based on display information of a second electronic device according to an embodiment of the present invention.

Referring to FIG. 8, in operation 801, the electronic device (e.g., the first electronic device 100 of FIG. 1 or the electronic device 200 of FIG. 2) can detect event generation for sub application program creation. For example, the electronic device can check whether an application program for sharing with the second electronic device is installed. For example, the electronic device can check whether the event for sub application program creation occurs based on input information detected through the input/output interface 240. For example, the electronic device can check whether the second electronic device for sharing the application program is connected.

In operation 803, the electronic device can obtain display information of the second electronic device (e.g., the second electronic device 110 of FIG. 1 or the electronic device 400 of FIG. 4) to send the sub application program. For example, the electronic device can obtain identification information of the second electronic device communicatively connected, and obtain corresponding display information of the second electronic device from the memory 230. When there is no corresponding display information of the second electronic device in the memory 230, the electronic device can request and receive the corresponding display information of the second electronic device from a server. For example, the electronic device can obtain the identification information of the second electronic device communicatively connected, and request and receive the corresponding display information of the second electronic device from the server. For example, the electronic device can receive the corresponding display information of the external electronic device from the second electronic device communicatively connected. Herein, the display information of the second electronic device can include at least one of a display area size or a resolution of the external electronic device.

In operation 805, the electronic device can create a sub application program corresponding to an application program to share with the second electronic device based on the display information of the second electronic device. For example, the electronic device can generate the sub application program corresponding to the application program to share with the second electronic device based on at least one of the UI component of the application program to share with the second electronic device and the display information of the second electronic device. The electronic device can generate the sub application program using the common programming language such as HTML.

In operation 807, the electronic device can send the sub application program to the second electronic device. For example, the electronic device can send installation information of the sub application program to the second electronic device.

Figure 9:
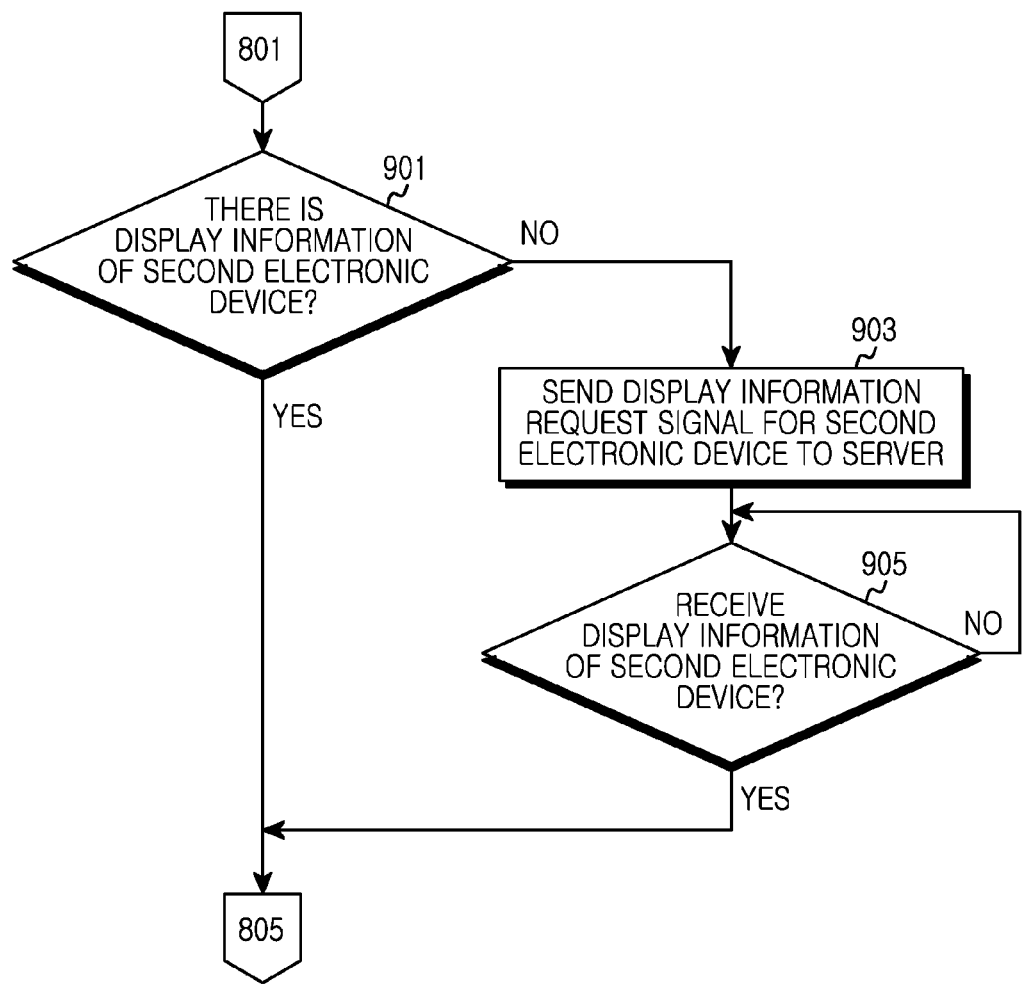
FIG. 9 depicts a flowchart for selectively receiving display information of a second electronic device from a server according to an embodiment of the present invention.

FIG. 9 depicts a flowchart for selectively receiving display information of a second electronic device from a server according to an embodiment of the present invention.

Referring to FIG. 9, in operation 901, when detecting the event generation for the sub application creation in the operation 801 of FIG. 8, the electronic device (e.g., the first electronic device 100 of FIG. 1 or the electronic device 200 of FIG. 2) can check whether the memory 230 contains the display information of the second electronic device (e.g., the second electronic device 110 of FIG. 1 or the electronic device 400 of FIG. 4). For example, the electronic device can obtain identification information of the second electronic device for sharing the application program and check whether the memory 230 contains corresponding display information of the second electronic device.

In operation 805 of FIG. 8, when the memory 230 contains the display information of the second electronic device, the electronic device can create the sub application program based on the display information of the second electronic device obtained from the memory 230.

In operation 903, when the memory 230 does not contain the display information of the second electronic device, the electronic device can send a request signal for the display information of the second electronic device to the server. For example, the electronic device can send the request signal including the identification information of the second electronic device to the server. Herein, the server can indicate the second electronic device which stores and manages the display information of the second electronic device.

In operation 905, the electronic device can checks whether the display information of the second electronic device is received from the server in response to the request signal.

In the operation 805 of FIG. 5, when receiving the display information of the second electronic device from the server in response to the request signal, the electronic device can create the sub application program based on the display information of the second electronic device received from the server.

After sending the request signal, when not receiving a response signal of the request signal during a reference signal, the electronic device can re-send the request signal for the display information of the second electronic device to the server. The electronic device can re-send the request signal for the display information of the second electronic device up to reference times.

According to an embodiment, when not obtaining the display information of the second electronic device, the electronic device can create the sub application program based on preset reference display information.

According to an embodiment, when not obtaining the display information of the second electronic device, the electronic device can display creation restrict information of the sub application program on the display 250.

Figure 10:
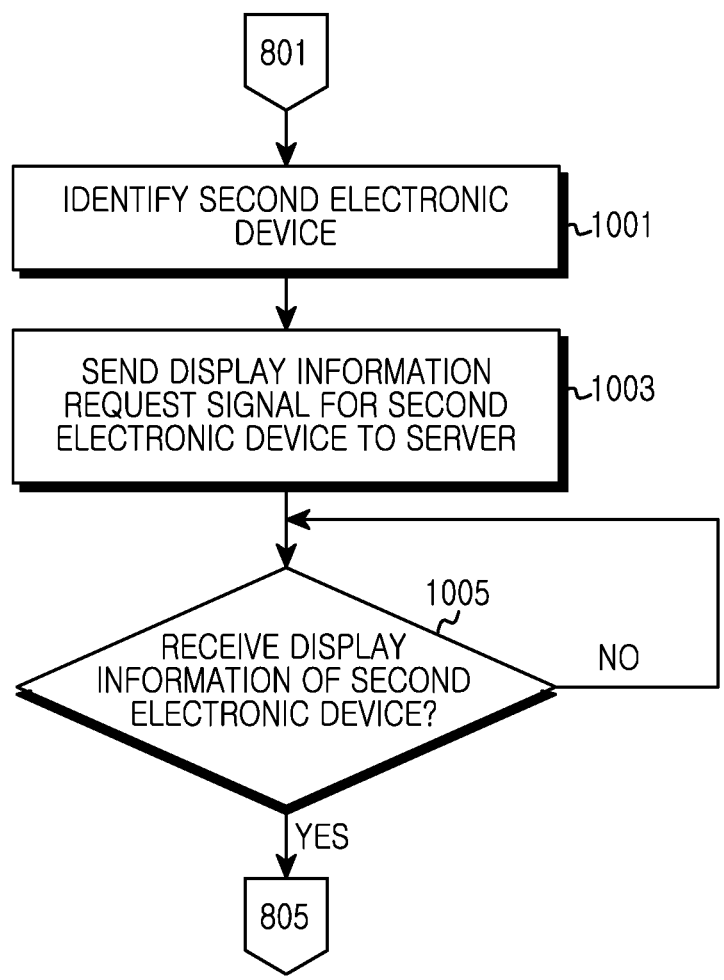
FIG. 10 depicts a flowchart for receiving display information of a second electronic device from a server according to an embodiment of the present invention.

FIG. 10 depicts a flowchart for receiving display information of a second electronic device from a server according to an embodiment of the present invention.

Referring to FIG. 10, in operation 1001, when detecting the event generation for the sub application creation in the operation 801 of FIG. 8, the electronic device (e.g., the first electronic device 100 of FIG. 1 or the electronic device 200 of FIG. 2) can obtain identification information of the second electronic device for sharing the application program. For example, the electronic device can confirm the identification information received from the second electronic device communicatively connected.

In operation 1003, the electronic device can send a request signal for the display information of the second electronic device to the server. For example, the electronic device can send the request signal including the identification information of the second electronic device to the server. Herein, the server can indicate the second electronic device which stores and manages the display information of the second electronic device.

In operation 1005, the electronic device can check whether the display information of the second electronic device is received from the server in response to the request signal.

In the operation 805 of FIG. 5, when receiving the display information of the second electronic device from the server in response to the request signal, the electronic device can create the sub application program based on the display information of the second electronic device received from the server.

After sending the request signal, when not receiving a response signal of the request signal during a reference signal, the electronic device can re-send the request signal for the display information of the second electronic device to the server. The electronic device can re-send the request signal for the display information of the second electronic device up to reference times.

According to an embodiment, when not obtaining the display information of the second electronic device, the electronic device can create the sub application program based on preset reference display information.

According to an embodiment, when not obtaining the display information of the second electronic device, the electronic device can display creation restrict information of the sub application program on the display 250.

Figure 11:
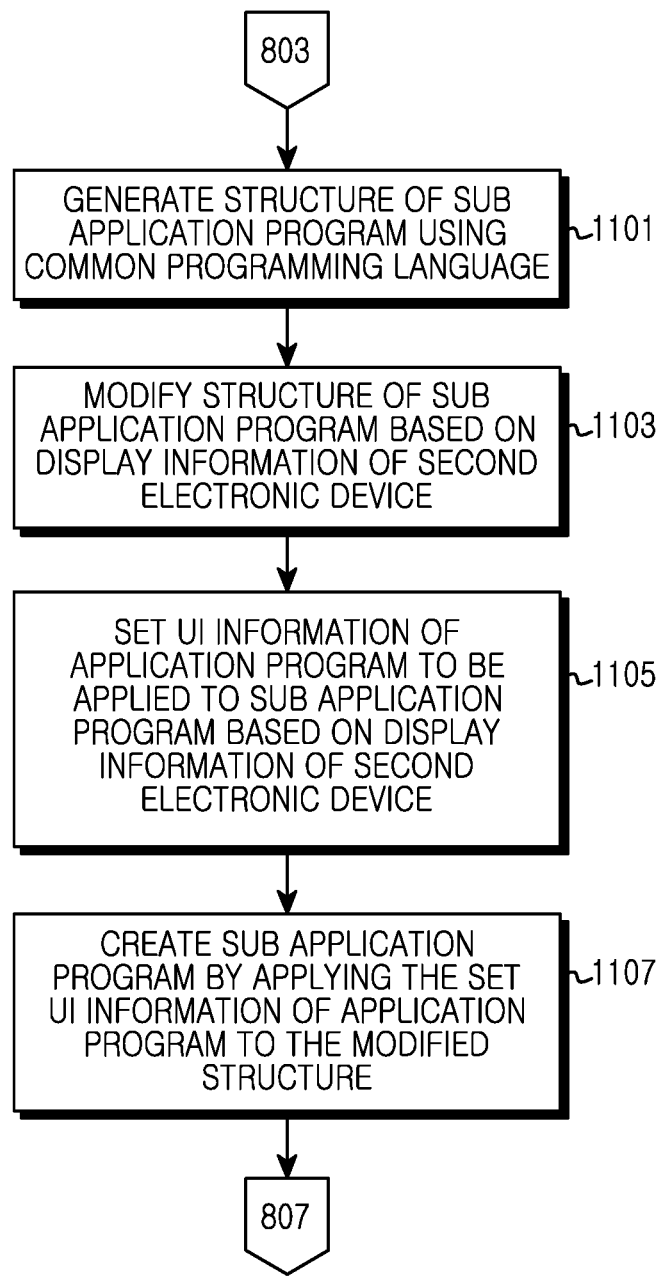
FIG. 11 depicts a flowchart for generating a sub application program according to an embodiment of the present invention.

FIG. 11 depicts a flowchart for creating a sub application program according to an embodiment of the present invention.

Referring to FIG. 11, in operation 1101, when obtaining the display information of the second electronic device in operation 803 of FIG. 8, the electronic device (e.g., the first electronic device 100 of FIG. 1 or the electronic device 200 of FIG. 2) can generate a basic structure (e.g., HTML DOM) of a sub application program using a common programming language (e.g., HTML).

In operation 1103, the electronic device can modify the basic structure of the sub application program based on the display information of the second electronic device. For example, the electronic device can adjust at least one of the size (e.g., UI size) of information to display on the second electronic device, the margins, the indents, the font (e.g. font type, font size), the image layout, or the size ratio between objects included in the basic structure of the sub application program based on the display information of the second electronic device.

In operation 1105, the electronic device can set a UI component of an application program to apply to the sub application program based on the display information of the second electronic device. For example, the electronic device can select UI components to be applied to the sub application program among UI components of the application program based on the display information of the second electronic device, and determine layout information of the selected UI components.

In operation 1107, the electronic device can create the sub application program by applying the UI component of the application program set in the operation 1105 to the structure of the sub application program modified in the operation 1103. For example, the electronic device can create the sub application program by converting the UI component of the application program to the component of the common programming language (e.g., HTML) as shown in Table 1.

TABLE 1

| UI componests | HTML component |
|---|---|
| Image | <img/> |
| Label | <div/>, <input/> |
| Text | <input/>, <textarea/> |
| Group | <div/> |
| Table | <table/> |
| Button | <button/> |

In operation 807 of FIG. 8, the electronic device can send the sub application program created in the operation 1107 to the second electronic device. For example, the electronic device can send installation information of the sub application program to the second electronic device.

Figure 12:
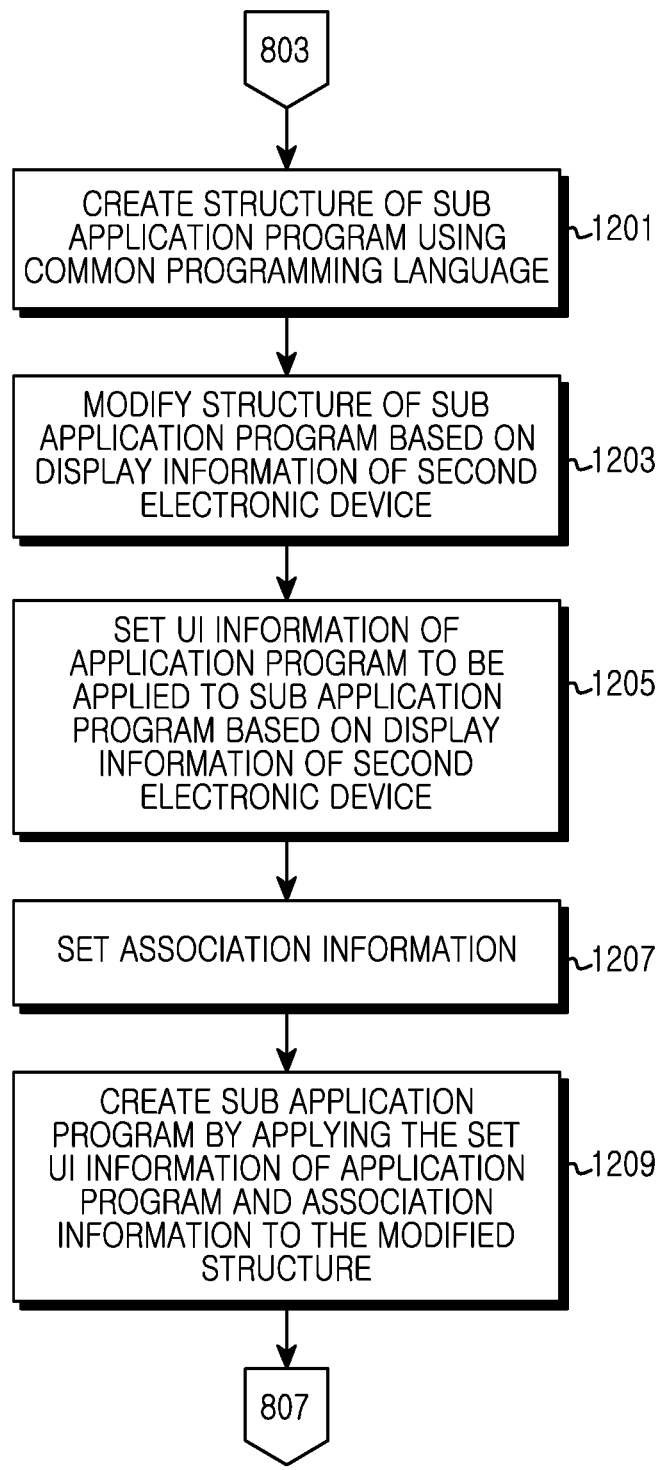
FIG. 12 depicts a flowchart for generating a sub application program according to an embodiment of the present invention.

FIG. 12 depicts a flowchart for creating a sub application program according to an embodiment of the present invention.

Referring to FIG. 12, in operation 1201, when obtaining the display information of the second electronic device in the operation 803 of FIG. 8, the electronic device (e.g., the first electronic device 100 of FIG. 1 or the electronic device 200 of FIG. 2) can generate a basic structure (e.g., HTML DOM) of a sub application program using the common programming language (e.g., HTML).

In operation 1203, the electronic device can modify the basic structure of the sub application program based on the display information of the second electronic device.

In operation 1205, the electronic device can set a UI component of an application program to apply to the sub application program based on the display information of the second electronic device. For example, the electronic device can select UI components to be applied to the sub application program among UI components of the application program based on the display information of the second electronic device, and determine layout information of the selected UI components.

In operation 1207, the electronic device can set association information for the sub application program so that the second electronic device can process an operation regarding interaction with the user in association with the electronic device through the sub application program. For example, the electronic device can set the association information in the sub application program so that the second electronic device installing the sub application program can request an operation for the user interaction such as button input from the first electronic device 200. The application program configuration module 310 can set the association information using the asynchronous processing object.

In operation 1209, the electronic device can create the sub application program by applying the UI component of the application program set in the operation 1205 and the association information set in the operation 1207 to the structure of the sub application program modified in the operation 1203. For example, the electronic device can create an HTML-type web application program.

In the operation 807 of FIG. 8, the electronic device can send the sub application program created in the operation 1209 to the second electronic device. For example, the electronic device can send installation information of the sub application program to the second electronic device.

In FIG. 11 and FIG. 12, the electronic device can generate the structure of the sub application program using the common programming language (1101, 1201), and then modify the basic structure of the sub application program based on the display information of the second electronic device (1103, 1203).

According to an embodiment, the electronic device can generate the structure of the sub application program corresponding to the display information of the second electronic device through the common programming language. For example, the application program configuration module 310 can generate the structure of the sub application program including the size (e.g., UI size) of the information to display on the second electronic device, the margins, the indents, the font (e.g. font type, font size), the image layout, or the size ratio between objects corresponding to the display information of the second electronic device.

In FIG. 12, the electronic device can set the association information so that the external electronic device and the electronic device can process, in association, an event (an operation for the interaction with the user) generated during the sub application program driving (1207).

According to an embodiment, the electronic device can create the sub application program so as to process the event generated during the sub application program driving in the external electronic device.

According to an embodiment, the electronic device can create the sub application program so as to process the event in the external electronic device, or to process in association with the external electronic device and the electronic device, based on a type of the event generated during the sub application program driving.

Figure 13:
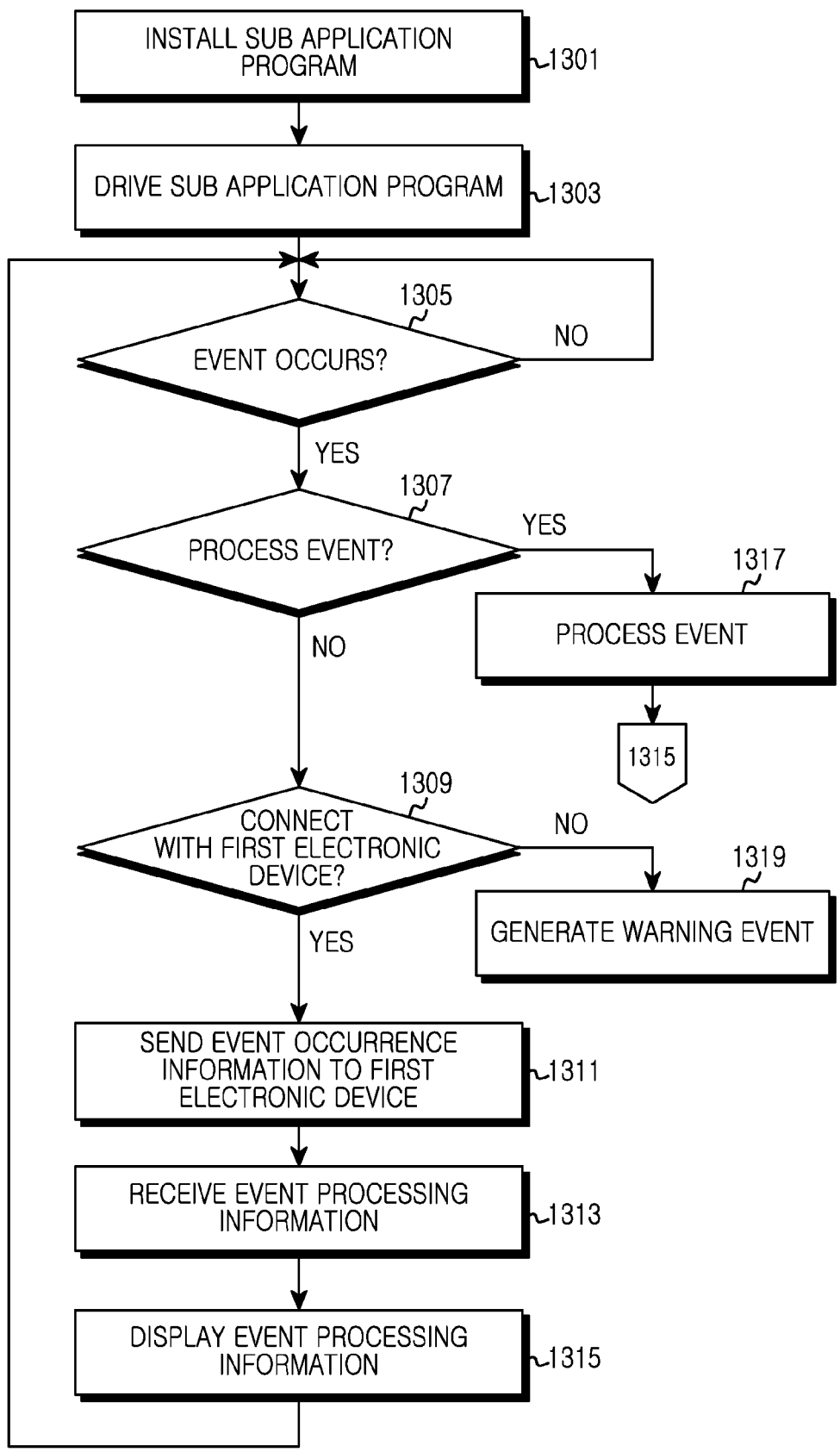
FIG. 13 depicts a flowchart for processing an event in a second electronic device in association with a first electronic device according to an embodiment of the present invention.

FIG. 13 depicts a flowchart for processing an event in a second electronic device in association with a first electronic device according to an embodiment of the present invention.

Referring to FIG. 13, in operation 1301, the electronic device (e.g., the second electronic device 110 of FIG. 1 or the electronic device 400 of FIG. 4) can install a sub application program received from a first electronic device (e.g., the first electronic device 100 of FIG. 1 or the electronic device 200 of FIG. 2).

In operation 1303, the electronic device can drive the sub application program.

In operation 1305, the electronic device can check whether an event occurs. For example, the electronic device can check whether an input for the sub application program is detected through the input/output interface 440 during the sub application program driving.

When no event occurs, the electronic device can check whether an event occurs during the sub application program driving.

In operation 1307, when detecting the event occurrence, the electronic device can check whether the electronic device can process the event. For example, the electronic device can check whether the electronic device can process the event based on an event type.

In operation 1317, when the electronic device can process the event, it can process the event generated in the operation 1305.

In operation 1309, when the electronic device cannot process the event, it can check whether a communication link can be connected with the first electronic device.

In operation 1319, when the communication link with the first electronic device is not connected, the electronic device can generate a warning event notifying that the event processing is limited. For example, the electronic device can generate the warning event including at least one of warning message displaying, warning sound generation, and vibration generation.

In operation 1311, when the communication link with the first electronic device is connected, the electronic device can send event occurrence information to the first electronic device which transmits the sub application program. For example, the electronic device can send the event occurrence information to the first electronic device based on association information of the sub application program.

In operation 1313, the electronic device can receive event processing information corresponding to the event occurrence information from the first electronic device.

In operation 1315, the electronic device can display the event processing information on the display 450. For example, the electronic device can display the event processing information processed in the operation 1317 or the event processing information received from the first electronic device on the display 450.

Figure 14:
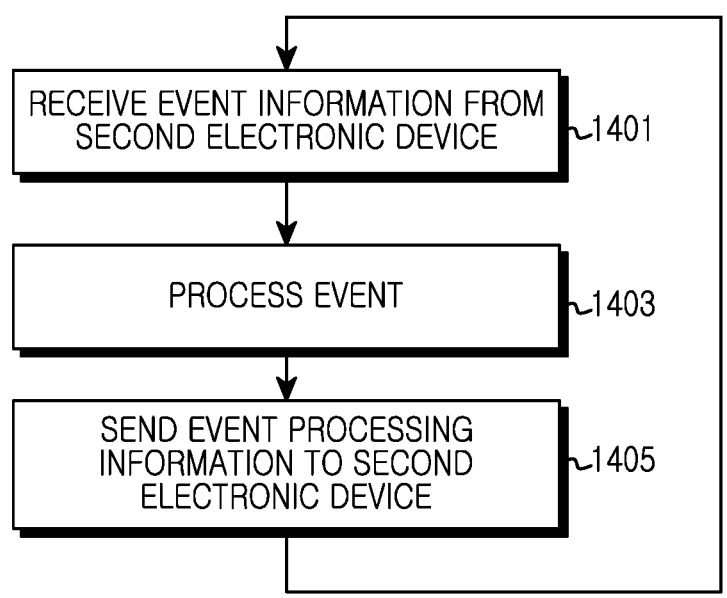
FIG. 14 depicts a flowchart for processing an event generated in a second electronic device in a first electronic device according to an embodiment of the present invention.

FIG. 14 depicts a flowchart for processing an event generated in a second electronic device in a first electronic device according to an embodiment of the present invention.

Referring to FIG. 14, in operation 1401, the electronic device (e.g., the first electronic device 100 of FIG. 1 or the electronic device 200 of FIG. 2) can receive event information from a second electronic device (e.g., the second electronic device 110 of FIG. 1 or the electronic device 400 of FIG. 4). For example, the electronic device can operate in an idle mode or in a sleep mode before receiving the event information.

In operation 1403, the electronic device can process an event generated in the second electronic device by driving an application program corresponding to a sub application program based on the event information received from the second electronic device.

In operation 1405, the electronic device can send event processing information to the second electronic device.

According to various embodiments of the present invention, a method for operating an electronic device (e.g., the first electronic device 100 of FIG. 1 or the electronic device 200 of FIG. 2) can include creating a sub application program comprising at least one of user interface components of an application program installed on the electronic device, and sending the sub application program to an external electronic device.

In an embodiment of the present invention, creating the sub application program can include creating the sub application program by converting at least one of the user interface components of the application program to a component of a common programming language.

In an embodiment of the present invention, the common programming language comprises HTML.

In an embodiment of the present invention, creating the sub application program can include obtaining display information of the external electronic device, generating a structure of the sub application program based on the display information of the external electronic device, determining at least one component to add to the sub application program among user interface components of an application program based on the display information of the external electronic device, and creating the sub application program corresponding to the application program based on the generated structure of the sub application program and the at least one determined component.

In an embodiment of the present invention, obtaining the display information can include obtaining identification information of the external electronic device, and obtaining the display information corresponding to the identification information of the external electronic device among multiple display information stored in a memory.

In an embodiment of the present invention, obtaining the display information can include receiving the display information of the external electronic device from a server.

In an embodiment of the present invention, creating the sub application program can include converting the at least one determined component to the component of the common programming language, and creating the sub application program corresponding to the application program by applying the component of the common programming language to the generated structure of the sub application program.

In an embodiment of the present invention, the display information can include at least one of a display area size or a resolution of the external electronic device.

In an embodiment of the present invention, creating the sub application program can include creating the sub application program to process an event generated in the external electronic device in association with the electronic device through the sub application program using an a synchronous processing object.

Figure 15:
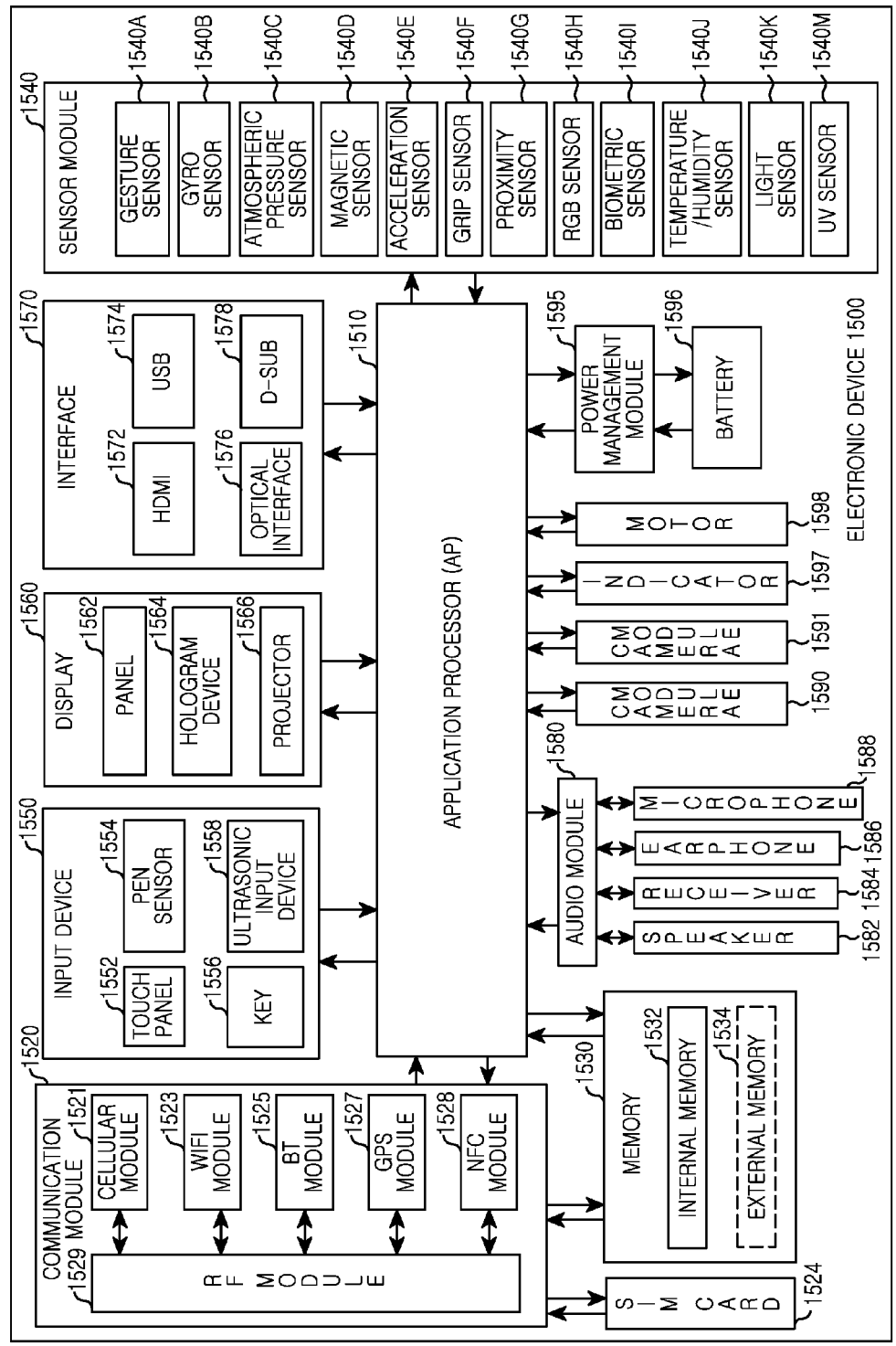
FIG. 15 depicts a block diagram of an electronic device according to an embodiment of the present invention.

FIG. 15 depicts a block diagram of an electronic device according to an embodiment of the present invention. Hereafter, the electronic device 1500 can configure, for example, all or part of the electronic device 200 of FIG. 2.

Referring to FIG. 15, the electronic device 1500 can include one or more Application Processors (APs) 1510, a communication module 1520, a Subscriber Identification Module (SIM) card 1524, a memory 1530, a sensor module 1540, an input device 1550, a display 1560, an interface 1570, an audio module 1580, a camera module 1591, a power management module 1595, a battery 1596, an indicator 1597, or a motor 1598.

The AP 1510 can control a plurality of hardware or software components connected to the AP 1510 by driving an operating system or an application program, and perform various data processing and operations including multimedia data. The AP 1510 can be implemented with, for example, a System on Chip (SoC). According to an embodiment, the AP 1510 can further include a Graphic Processing Unit (GPU).

The communication module 1520 (e.g., the communication interface 260) can perform data transmission and reception in communication with other electronic devices connected to the electronic device 1500 (e.g., the electronic device 200) over a network. According to an embodiment, the communication module 1520 can include a cellular module 1521, a WiFi module 1523, a BT module 1525, a GPS module 1527, an NFC module 1528, or a Radio Frequency (RF) module 1529.

The cellular module 1521 can provide voice call, video call, text service, or Internet service through a communication network (e.g., LTE, LTE-A, CDMA, WCDMA, UMTS, WiBro, or GSM). Also, the cellular module 1521 can identify and authenticate the electronic device in the communication network by using, for example, a SIM (e.g., the SIM card 1524). According to an embodiment, the cellular module 1521 can perform at least part of functions which can be provided from the AP 1510. For example, the cellular module 1521 can perform at least part of a multimedia control function.

According to an embodiment, the cellular module 1521 can include a Communication Processor (CP). Also, the cellular module 1521 can be implemented with, for example, a SoC. While the components such as the cellular module 1521 (e.g., the CP), the memory 1530, or the power management module 1595 are depicted as the separate components from the AP 1510, according to an embodiment, the AP 1510 can be implemented to include at least part (e.g., the cellular module 1521) of the above-stated components.

According to an embodiment, the AP 1510 or the cellular module 1521 (e.g., the CP) can load and process an instruction or data received from its connected non-volatile memory or at least one of the other components, in a volatile memory. Also, the AP 1510 or the cellular module 1521 can store data received from at least one of the other components or generated by at least one of the other components, in the non-volatile memory.

The WiFi module 1523, the BT module 1525, the GPS module 1527, or the NFC module 1528 each can include, for example, a processor for processing the data transmitted and received via the corresponding module. While the cellular module 1521, the WiFi module 1523, the BT module 1525, the GPS module 1527, or the NFC module 1528 is separated from each other in FIG. 15, according to an embodiment, at least some (e.g., at least two) of the cellular module 1521, the WiFi module 1523, the BT module 1525, the GPS module 1527, or the NFC module 1528 can be included in a single Integrated Chip (IC) or an IC package. For example, at least part (e.g., a CP corresponding to the cellular module 1521 and a WiFi processor corresponding to the WiFi module 1523) of the processors corresponding to the cellular module 1521, the WiFi module 1523, the BT module 1525, the GPS module 1527, or the NFC module 1528 can be implemented as a single SoC.

The RF module 1529 can transmit and receive data, for example, RF signals. The RF module 1529 can include, for example, a transceiver, a Power Amp Module (PAM), a frequency filter, or a Low Noise Amplifier (LNA), which are not shown. Also, the RF module 1529 can further include a part, for example, a conductor or a conducting wire, for sending and receiving electromagnetic waves in free space during the wireless communication. While the cellular module 1521, the WiFi module 1523, the BT module 1525, the GPS module 1527, and the NFC module 1528 share the single RF module 15215 in FIG. 15, according to an embodiment, at least one of the cellular module 1521, the WiFi module 1523, the BT module 1525, the GPS module 1527, or the NFC module 1528 can transmit and receive the RF signals via a separate RF module.

According to an embodiment, the RF module 1529 can include at least one of a main antenna and a sub antenna functionally connected with the electronic device 1500. The communication module 1520 can support Multiple Input Multiple Output (MIMO) such as diversity using the main antenna and the sub antenna.

The SIM card 1524 can be a card including the SIM and inserted into a slot formed at a specific location of the electronic device. The SIM card 1524 can include unique identification information (e.g., Integrated Circuit Card Identifier (ICCID)) or subscriber information (e.g., International Mobile Subscriber Identity (IMSI)).

The memory 1530 can include an internal memory 1532 or an external memory 1534. The internal memory 1532 can include, for example, at least one of the volatile memory (e.g., Dynamic RAM (DRAM), Static RAM (SRAM), Synchronous Dynamic RAM (SDRAM)) or the non-volatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment, the internal memory 1532 can be a Solid State Drive (SSD). The external memory 1534 can include a flash drive, for example, a Compact Flash (CF), a Secure Digital (SD), a Micro-SD, a Mini-SD, an extreme digital (xD), or a memory stick. The external memory 1534 can be functionally connected to the electronic device 1500 through various interfaces. According to an embodiment, the electronic device 1500 can further include a storage device (or a storage medium) such as hard drive.

The sensor module 1540 can measure a physical quantity or detect an operation status of the electronic device 1500, and convert the measured or detected information to an electric signal. The sensor module 1540 can include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., a Red, Green, Blue (RGB) sensor), a biometric sensor 1540I, a temperature/humidity sensor 1540J, a light sensor 1540K, or an Ultra Violet (UV) sensor 1540M. Additionally or alternatively, the sensor module 1540 can include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a finger print sensor (not shown). The sensor module 1540 can further include a control circuit for controlling its one or more sensors.

The input device 1550 can include a touch panel 1552, a (digital) pen sensor 1554, a key 1556, or an ultrasonic input device 1558. The touch panel 1552 can recognize touch input using, for example, at least one of capacitive, resistive, infrared, or ultrasonic wave techniques. Also, the touch panel 1552 may further include a control circuit. The capacitive type can recognize physical contact or proximity. The touch panel 1552 may further include a tactile layer. In this case, the touch panel 1552 can provide a tactile response to the user.

The (digital) pen sensor 1554 can be implemented using, for example, the same or similar method as or to the user's touch input, or using a separate recognition sheet. The key 1556 can include, for example, a physical button, an optical key, or a keypad. The ultrasonic input device 1558 is a device capable of obtaining data by detecting microwaves through a microphone (e.g., a microphone 1588) in the electronic device 1500 through an input tool which generates an ultrasonic signal, and allows radio frequency identification. The electronic device 1500 may receive user input from an external device (e.g., a computer or a server) connected using the communication module 1520.

The display 1560 (e.g., the display 250) can include a panel 1562, a hologram device 1564, or a projector 1566. The panel 1562 can be, for example, an LCD or an AMO-LED. The panel 1562 can be implemented, for example, flexibly, transparently, or wearably. The panel 1562 may be constructed as the single module with the touch panel 1552. The hologram device 1564 can present a three-dimensional image in the air using interference of light. The projector 1566 can display an image by projecting the light onto a screen. The screen can be placed, for example, inside or outside the electronic device 1500. According to an embodiment, the display 1560 can further include a control circuit for controlling the panel 1562, the hologram device 1564, or the projector 1566.

The interface 1570 can include, for example, an HDMI 1572, a USB 1574, an optical interface 1576, or a D-sub-miniature (D-sub) 1578. Additionally or alternatively, the interface 1570 can include, for example, Mobile High-Definition Link (MHL) interface, SD card/Multi-Media Card (MMC) interface, or Infrared Data Association (IrDA) standard interface.

The audio module 1580 can convert sound to an electric signal and vice versa. The audio module 1580 can process sound information which is input or output through, for example, a speaker 1582, a receiver 1584, an earphone 1586, or the microphone 1588.

The camera module 1591 is a device for capturing a still picture and a moving picture, and can include, according to an embodiment, one or more image sensors (e.g., a front sensor or a rear sensor), a lens (not shown), an Image Signal Processor (ISP) (not shown), or a flash (e.g., LED or xenon lamp) (not shown).

The power management module 1595 can manage power of the electronic device 1500. The power management module 1595 can include, although not depicted, for example, a Power Management IC (PMIC), a charger IC (IC), or a battery or fuel gauge.

The PMIC can be mounted in, for example, an IC or a SoC conductor. The charging type can be divided to a wired type and a wireless type. The charger IC can charge the battery, and prevent overvoltage or over current flow from the charger. According to an embodiment, the charger IC can include a charger IC for at least one of the wired charging type or the wireless charging type. The wireless charging type includes, for example, a magnetic resonance type, a magnetic induction type, or a microwave type, and can add an additional circuit for the wireless charging, for example, a circuit such as coil loop, resonance circuit, or rectifier.

The battery gauge can, for example, measure the remaining capacity of the battery 1596 and the voltage, the current, or the temperature of the charging. The battery 1596 can generate or store electricity, and supply the power to the electronic device 1500 using the stored or generated electricity. The battery 1596 can include, for example, a rechargeable battery or a solar battery The indicator 1597 can display a specific status of the electronic device 1500 or its part (e.g., AP 1510), for example, a booting state, a message state, or a charging state. The motor 1599 can convert the electric signal to a mechanic vibration. Although it is not depicted, the electronic device 1500 can include a processing device (e.g., a GPU) for mobile TV support. The processing device for the mobile TV support can process media data in conformity to a standard, for example, Digital Multimedia Broadcasting (DMB), Digital Video Broadcasting (DVB), or media flow.

The aforementioned components of the electronic device according to various embodiments of the present invention each can include one or more components, and the name of the corresponding component can differ according to the type of the electronic device. The electronic device according to various embodiments of the present invention can include at least one of the aforementioned components, omit some components, or further include other components. Also, some of the components of the electronic device according to various embodiments of the present invention can be united into a single entity to thus carry out the same functions of the corresponding components.

The term "module" used in various embodiments of the present invention can indicate, for example, a unit including a combination of one or more of hardware, software, or firmware. The "module" can be interchangeably used with the terms, for example, "a unit," "logic," "a logical block," "a component," or "a circuit." The "module" can be a minimum unit or part of the components integrally formed. The "module" can be a minimum unit or part for performing one or more functions. The "module" can be implemented mechanically or electronically. For example, the "module" according to various embodiments of the present invention can include at least one of an Application-Specific Integrated Circuit (ASIC), a Field-Programmable Gate Array (FPGA), or a programmable-logic device for performing operations which are well known or will be developed.

According to various embodiments of the present invention, at least part of the device (e.g., the modules or the functions) or the method (e.g., the operations) according to various embodiments of the present invention can be implemented using, for example, instructions stored as the programming module in a computer-readable storage medium. When an instruction is executed by one or more processors, the one or more processors perform the corresponding function. The computer-readable storage medium can be, for example, the memory. At least part of the programming module can be implemented (e.g., executed) by the processor. At least part of the programming module can include, for example, a module, a program, a routine, sets of instructions, or a process for performing one or more functions.

The computer-readable recording medium can include magnetic media such as a hard disk, a floppy disk and a magnetic tape, an optical media such as a CD-ROM and a DVD, magneto-optical media such as a floptical disk, and hardware devices specifically configured to store and execute an application instruction (e.g., the programming module) such as a ROM, a RAM, and a flash memory. Also, a program instruction can include not only machine code made by a compiler but also high-level language code executable by a computer using an interpreter. The above-stated hardware device can serve as one or more software modules for fulfilling the operations of various embodiments of the present invention, and vice versa.

A module or a program module according to various embodiments of the present invention can include at least one or more of the aforementioned components, omit some of them, or further include additional other components. Operations performed by a module, a program module, or other components according to various embodiments of the present invention can be executed in a sequential, parallel, repetitive, or heuristic manner. In addition, some operations can be executed in a different order or be omitted, or other operations can be added.

According to various embodiments, in a storage medium storing instructions, the instructions are set to, when executed by at least one processor, make the at least one processor carry out at least one operation. The at least one operation can include, in an electronic device, sending or receiving at least one of a first signal corresponding to a first communication network or a second signal corresponding to a second communication network, or when receiving the at least one signal, distributing the at least one signal to a first communication control module for processing the first signal or a second communication control module for processing the second signal based on a service provided by the electronic device corresponding to the first signal and the second signal.

The embodiments of the present invention disclosed in the specification and drawings merely present specific examples to easily explain technical details according to embodiments of the present invention and to ease the understanding of the embodiments of the present invention, and do not limit the range of the embodiments of the present invention. Therefore, it should be construed that all differences or modifications derived from technical concepts of various embodiments of the present invention besides the disclosed embodiments fall within the range of the various embodiments of the present invention.

The invention claimed is:

1. An electronic device comprising:
a memory configured to store instructions; and
a processor, by executing the instructions, being configured to:
generate, based on display information of an external electronic device, a sub application program comprising at least one of a plurality of user interface components of an application program installed on the electronic device;
send the sub application program to the external electronic device;
identify, in response to receiving a request transmitted from the external electronic device, a state of the electronic device, wherein the request is transmitted from the external electronic device in response to receiving an input on a user interface of the sub application program being displayed in the external electronic device;
change, in response to identifying the state corresponds to an idle mode or a sleep mode, the state of the electronic device to an activation mode for enabling execution of the application program;
execute, in response to completion of the changing of the state, the application program with the received request; and
transmit, in response to identifying a result of the execution of the application with the received request, information regarding the identified result to the external electronic device.

2. The electronic device of claim 1, wherein the processor is further configured to
obtain the display information of the external electronic device.

3. The electronic device of claim 2,
wherein the processor is further configured to:
obtain identification information of the external electronic device, and
obtain the display information corresponding to the identification information of the external electronic device from among multiple display information stored in the memory.

4. The electronic device of claim 1, wherein the processor is configured to generate the sub application program as a common programming language.

5. The electronic device of claim 4, wherein the common programming language comprises HyperText Markup Language (HTML).

6. The electronic device of claim 1, wherein the processor is further configured to receive the display information of the external electronic device from a server.

7. The electronic device of claim 1,
wherein the processor is further configured to:
identify whether the display information of the external device can be obtained from the memory, and
if the memory does not store the display information of the external device, receive the display information of the external device from a server.

8. The electronic device of claim 1, wherein the display information of the external electronic device comprises at least one of a display area size or a resolution of the external electronic device.

9. The electronic device of claim 1, wherein the processor is further configured to change, based on the display information of the external electronic device, a structure of the user interface of the sub application program.

10. A method for operating an electronic device, comprising:
generating, based on display information of an external electronic device, a sub application program comprising at least one of a plurality of user interface components of an application program installed on the electronic device;
sending the sub application program to the external electronic device;
identifying, in response to receiving a request transmitted from the external electronic device, a state of the electronic device, wherein the request is transmitted from the external electronic device in response to receiving an input on a user interface of the sub application program being displayed in the external electronic device;

changing, in response to identifying the state corresponds to an idle mode or a sleep mode, the state of the electronic device to an activation mode for enabling execution of the application program;

executing, in response to completion of the changing of the state, the application program with the received request; and transmitting, in response to identifying a result of the execution of the application with the received request, information regarding the identified result to the external electronic device.

11. The method of claim 10, further comprising:
obtaining the display information of the external electronic device.

12. The method of claim 11, wherein obtaining the display information comprises:
obtaining identification information of the external electronic device, and
obtaining the display information corresponding to the identification information of the external electronic device from among multiple display information stored in a memory.

13. The method of claim 10, wherein the generating the sub application program comprises generating the sub application program as a common programming language.

14. The method of claim 13, wherein the common programming language comprises HyperText Markup Language (HTML).

15. The method of claim 10, further comprising:
changing, based on the display information of the external electronic device, a structure of the user interface of the sub application program.

16. The method of claim 10, further comprising:
receiving the display information of the external electronic device from a server.

17. The method of claim 10, wherein the display information of the external electronic device comprises at least one of a display area size or a resolution of the external electronic device.

18. The method of claim 10, further comprising:
identifying whether the display information of the external device can be obtained from a memory of the electronic device, and
if the memory does not store the display information of the external device, receiving the display information of the external device from a server via a communication interface of the electronic device.

* * * * *